G. C. MAGERL.
CORN PLANTER.
APPLICATION FILED JUNE 27, 1914.
1,140,755.
Patented May 25, 1915.
4 SHEETS—SHEET 4.
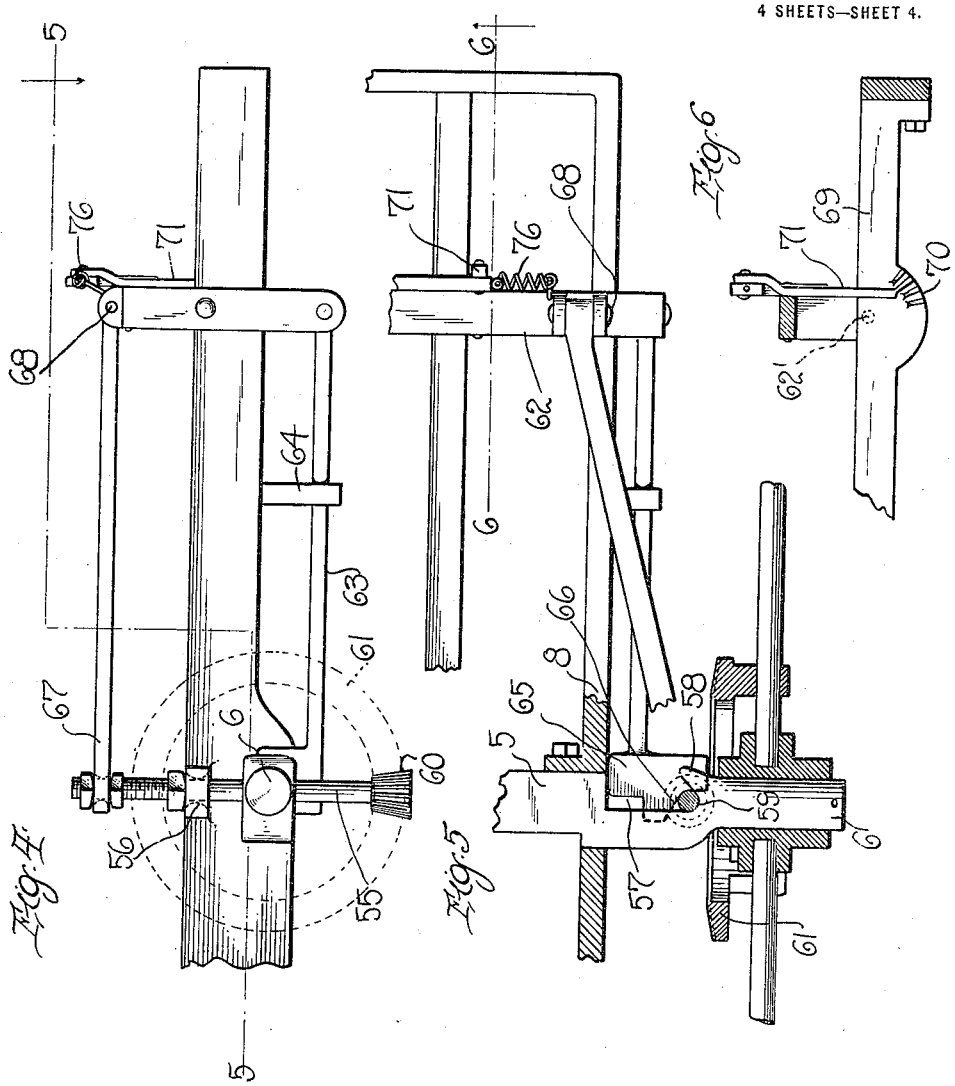
Witnesses
Robert M. Sutphen
A. J. Hund
Inventor
G. C. Magerl
By Watson E. Coleman
Attorney

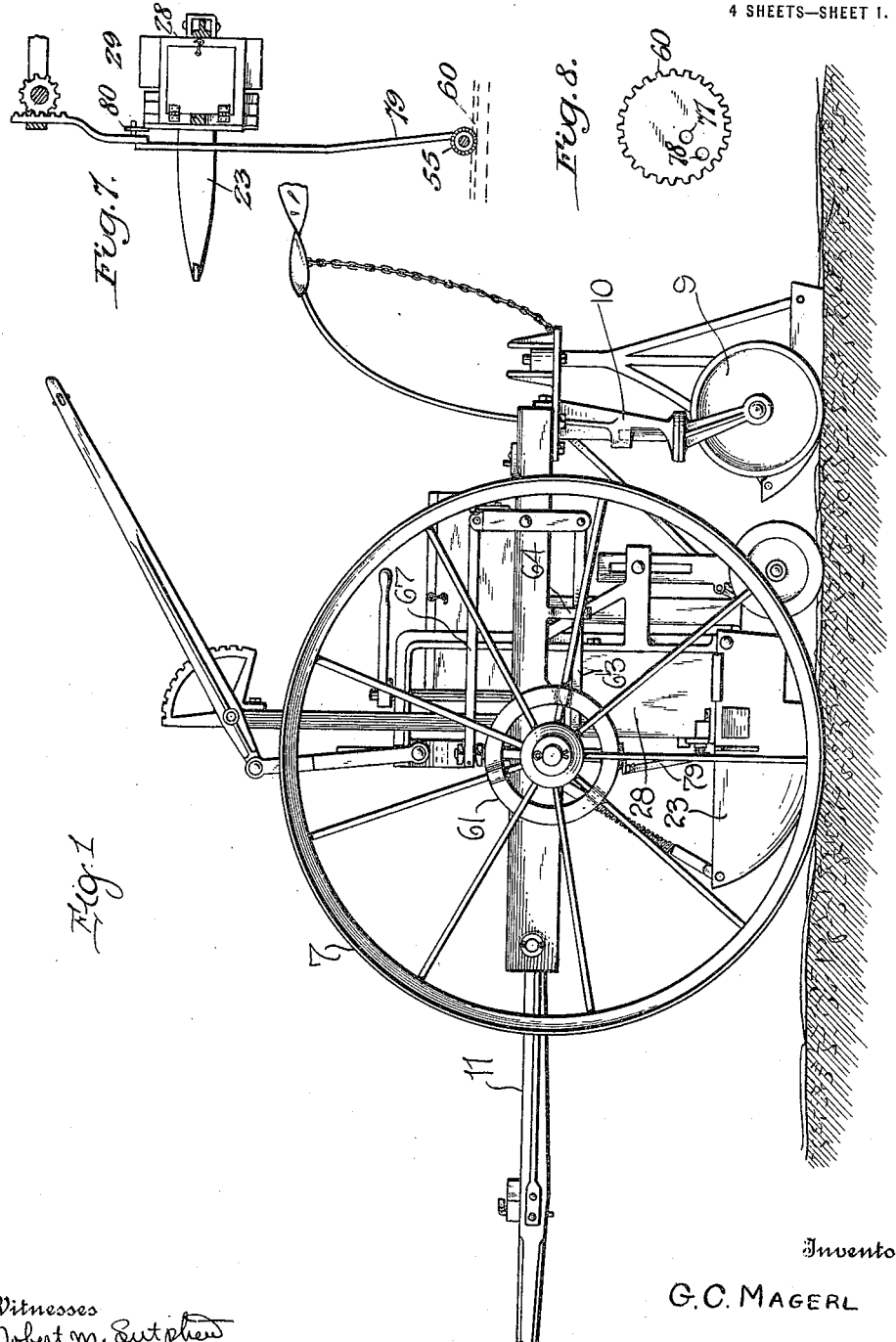

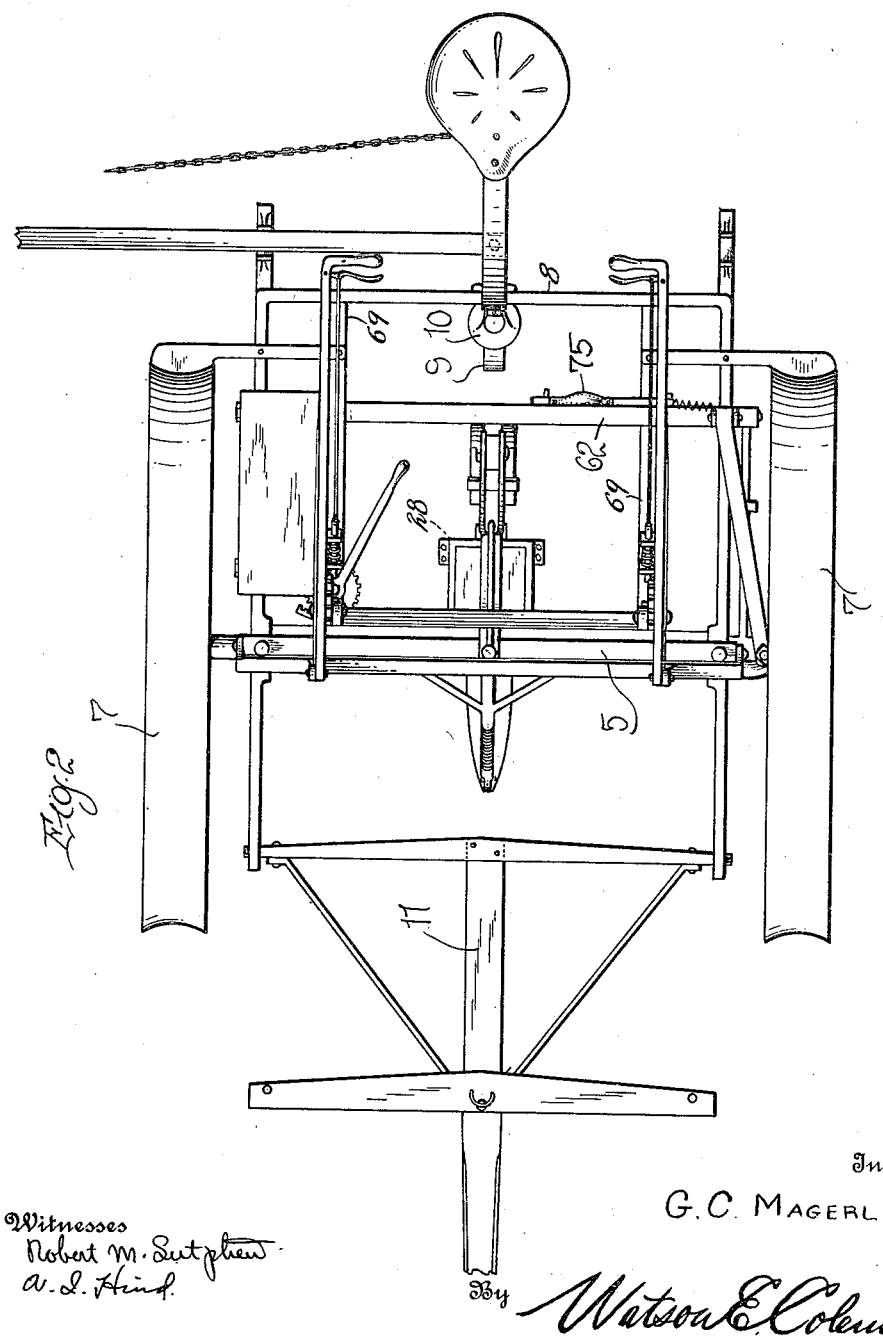

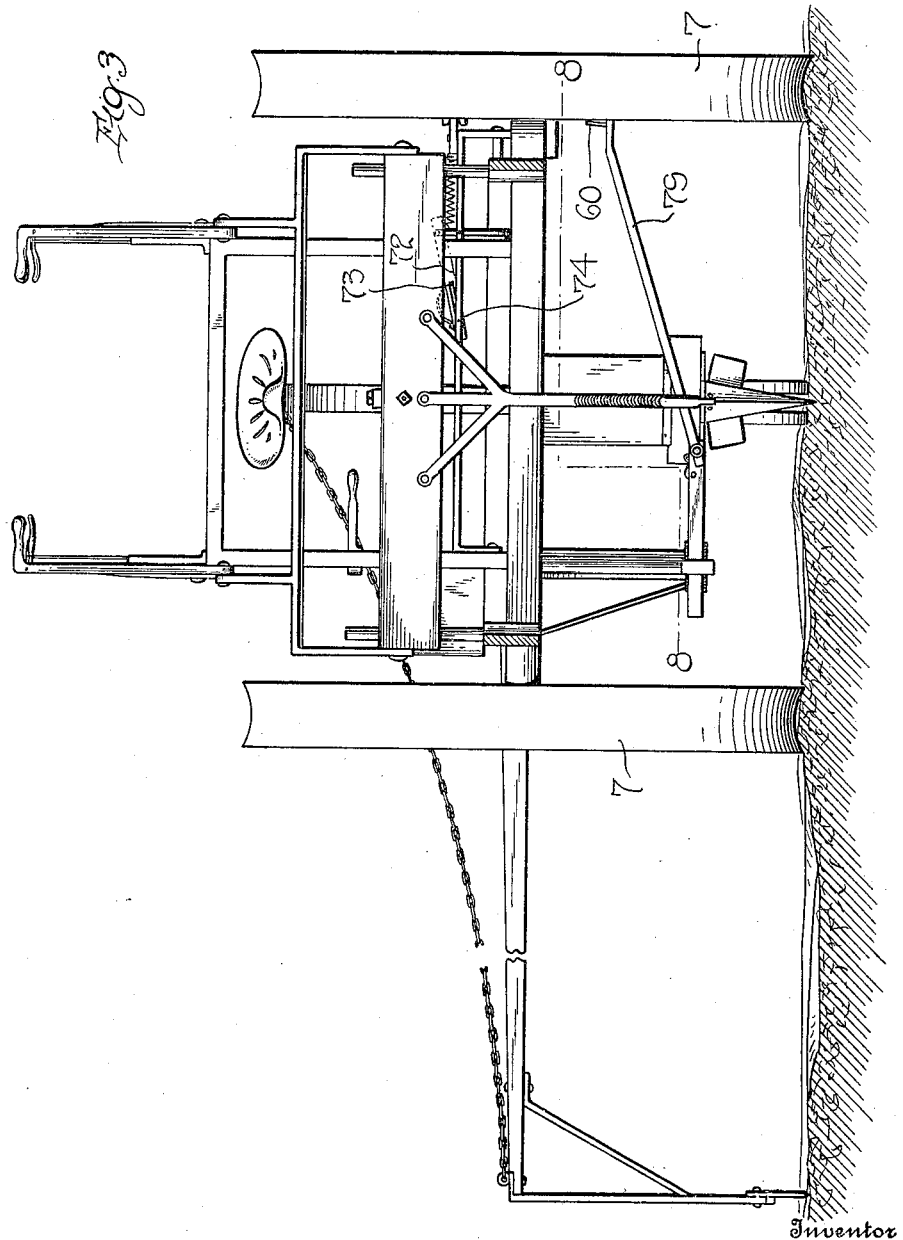

UNITED STATES PATENT OFFICE.

GEORGE C. MAGERL, OF NECEDAH, WISCONSIN.

CORN-PLANTER.

1,140,755.　　　　　Specification of Letters Patent.　　Patented May 25, 1915.

Application filed June 27, 1914. Serial No. 847,712.

*To all whom it may concern:*

Be it known that I, GEORGE C. MAGERL, a citizen of the United States, residing at Necedah, in the county of Juneau and State of Wisconsin, have invented certain new and useful Improvements in Corn-Planters, of which the following is a specification, reference being had to the accompanying drawings.

This invention relates to corn planters, and has for its primary object to generally improve and simplify the construction of machines of this character, and has more particular relation to the means for actuating the planting mechanism.

The invention has for another important object to provide improved means whereby the planting mechanism may be easily and quickly thrown into or out of operation at the will of the operator.

The invention has for a further general object to improve and simplify the construction of machines of the above character whereby the planting of corn is materially facilitated, and the machine, as a whole, rendered very serviceable and reliable in practical use.

With the above and other objects in view, the invention consists in novel features of construction, combination and arrangement of parts as will be hereinafter referred to and more particularly pointed out in the specification and claims.

For a full understanding of the invention, reference is to be had to the following description and accompanying drawings, in which—

Figure 1 is a side elevation of a corn planter embodying my invention in its preferred form; Fig. 2 is a top plan view thereof; Fig. 3 is a front end elevation, the frame being shown in section; Fig. 4 is an enlarged fragmentary side elevation, the supporting wheel being removed; Fig. 5 is a section taken on the line 5—5 of Fig. 4; Fig. 6 is a section taken on the line 6—6 of Fig. 5; Fig. 7 is a section taken on the line 8—8 of Fig. 3; Fig. 8 is an end view of the gear or pinion to which the operating pitman for the planting mechanism is eccentrically connected.

Referring in detail to the drawings, 5 designates the axle having a body portion of rectangular form in cross section and cylindrical end portions 6 upon which the supporting wheels 7 are loosely mounted. To the ends of the rectangular body portion of the wheel axle, the frame 8 of the machine is bolted or otherwise rigidly secured. This frame is of substantially U-shape form in plan and the rear end thereof is supported by a crazy wheel 9 which may be of any approved form and construction, and is mounted in a suitable bearing standard 10 depending from the frame. To the forward ends of the longitudinal bars of the frame 8 the customary draft pole 11 is connected. The frame 8 also includes the intermediate bars 69, hereinafter more particularly referred to.

In the frame of the machine, a seed box, indicated at 28, is mounted in any suitable manner, and is provided with seed planting mechanism in its base to intermittently deposit the seed into a depending boot connected to the furrow opening shoe or runner 23.

For the purpose of operating the seed depositing mechanism, I provide the rod or spindle 55 which is fulcrumed or swiveled at a point intermediate of its ends in a bearing bracket 56 fixed upon one of the side bars of the frame 8. The shaft 5 exteriorly of the frame 8 and between the side of the frame and the cylindrical end of the shaft is provided in its rear edge with a recess 57, the outer end of which is formed with a rearwardly and inwardly projecting lug or finger 58 which produces a pocket 59. This pocket is adapted to receive the spindle 55. Upon the lower end of said spindle the pinion 60 is keyed or otherwise fixed, and is adapted to mesh with a gear 61 which is suitably mounted or secured upon the spokes of one of the wheels 7 and upon the inner side thereof.

For the purpose of shifting the pinion 60 into and out of meshing engagement with the gear 61, I provide a transversely disposed bar 62, the ends of which are downwardly extended and pivotally mounted upon the side bars of the frame 8. One end of this transverse bar 62 projects below the frame and to the same a forwardly extending rod 63 is pivotally connected. This rod is mounted for sliding movement in a suitable guide 64 secured upon the frame and at its forward end is formed with an enlarged head 65. This head is provided with a concave face 66 which is adapted for engagement with the spindle 55. The upper end of the spindle 55 is also swiveled in the forward end of an obliquely disposed bar 67, the rear end of which is pivotally connected as at 68 to the transverse bar 62. As before stated, the bar 62 is pivotally mounted at its ends as at 62' upon the frame 8, and upon one of the intermediate longitudinal bars 69 which extend between the rear end of the frame bar 8 and the rear axle 5, a series of teeth 70 are formed in concentric relation to the pivot bar 62'. These teeth are adapted for engagement by the lower end of a locking bar 71 which is fulcrumed adjacent its upper end upon the edge of the bar 62. The upper end of this locking bar which projects above the transverse bar 62 is pivotally connected to a slide bar 72 which is provided with a longitudinal slot 73 to receive a pin 74 projecting from the transverse bar 62. A foot strap indicated at 75 is secured to the bar 72 wherein the same may be readily actuated. One end of a coil spring 76 is connected to this slide bar 72, and has its other end fixed to the bar 62. This spring normally acts to hold the bar 72 against shifting movement and maintain the lower end of the locking bar 71 in engagement with the teeth 70. It will be readily understood from this construction that the bar 62 may be readily released by shifting the slide bar 72 against the action of the spring 76, and said transverse bar 62 moved upon the frame 8. Upon forcing forwardly upon this bar 62, it will be seen that the spindle 55 is oscillated in its bearing 56 and the upper end thereof moved forwardly, while the lower end thereof is forced rearwardly, the head 65, of course, being drawn rearwardly with the rod 63 when said bar 62 is actuated. The inclined projection or finger 58 on the axle 5 directs the spindle 55 inwardly toward the frame as the lower portion of said spindle moves rearwardly, and thus disengages the pinion 60 on the spindle from the gear 61 and the supporting wheel.

The lower face of the pinion 60 is provided with eccentrically located inner and outer threaded sockets 77 and 78 which are adapted to receive a pin or screw in one end of the pitman 79. The other end of this pitman is pivotally connected to the perforated ear 80 provided upon one end of the sliding valve plate of the seed planting mechanism. When it is desired to plant the corn in drills, the planting mechanism, hereinbefore referred to, is employed and the pitman 79 is connected to the outermost opening or socket 78 in the pinion 60 so that there is a comparatively extensive sliding movement of the feed plate.

From the foregoing description taken in connection with the accompanying drawings, the construction, manner of operation, and several advantages of my improved corn planter will be clearly and fully understood.

The machine as a whole is comparatively simple in its construction, highly efficient and reliable in practical use and operates to expeditiously and properly plant the corn either in drills or in checked rows at the option of the operator.

While I have above described the preferred form, construction and arrangement of the several elements employed, it will be understood that the device is, nevertheless, susceptible of considerable modification therein, and I therefore reserve the privilege of resorting to all such legitimate changes as may be fairly embodied within the spirit and scope of the invention as claimed.

What is claimed is:

1. In a corn planter, a wheel supported axle, a frame mounted upon said axle, planting mechanism mounted in said frame, a gear secured upon one of the supporting wheels, a bodily movable spindle, a pinion fixed upon said spindle to mesh with said gear, means connecting the pinion to the planting mechanism, manually operable means to move the spindle longitudinally of the wheel axle and engage the same with said gear in the movement of the spindle in one direction, and a finger formed upon the axle and coöperating with said spindle to move the pinion out of engagement with the gear when said spindle is moved in an opposite direction.

2. In a corn planter, a wheel supported axle, a frame mounted upon said axle, planting mechanism mounted in said frame, a gear secured upon one of the supporting wheels, a vertically disposed spindle swiveled intermediate of its ends upon the frame, said axle being provided with a recess through which said spindle extends, a pinion fixed upon said spindle, means connecting said pinion to the planting mechanism, and manually operable means connected to the spindle to move the same in the recess of the axle to engage or disengage said pinion with or from said gear.

3. In a corn planter, a wheel supported axle, a main frame mounted upon said axle, planting mechanism mounted in said frame, a gear secured upon one of the supporting wheels, said axle being provided with a recess, a vertically disposed spindle swiveled upon the main frame and engaged in one end of said recess, a pinion fixed upon the lower end of said spindle, said axle being formed with an obliquely inclined projection at the latter end of the recess therein, means connecting said pinion to the planting mechanism to actuate the same, and manually operable means for oscillating said spindle whereby the same is directed by said finger to disengage the pinion from said gear or direct the same into mesh therewith.

In testimony whereof I hereunto affix my signature in the presence of two witnesses.

GEORGE C. MAGERL.

Witnesses:
Mrs. H. P. CHRISTENSEN,
F. M. MAGERL.

Copies of this patent may be obtained for five cents each, by addressing the "Commissioner of Patents, Washington, D. C."